United States Patent
Herman et al.

[11] Patent Number: 6,139,595
[45] Date of Patent: Oct. 31, 2000

[54] AIR/OIL COALESCER WITH CENTRIFUGALLY ASSISTED DRAINAGE

[75] Inventors: Peter K. Herman, Cookeville; Richard Jensen, deceased, late of Cookeville, by Shirley Ann Jensen, executrix; Gregory W. Hoverson, Cookeville, all of Tenn.

[73] Assignee: Fleetguard, Inc., Nashville, Tenn.

[21] Appl. No.: 09/157,019

[22] Filed: Sep. 18, 1998

[51] Int. Cl.[7] .................................................. B01D 46/26
[52] U.S. Cl. .................................... 55/312; 55/400; 55/401
[58] Field of Search ............................. 55/353, 400, 401, 55/403, 312, 313, 314, 317; 95/273, 277

[56] References Cited

U.S. PATENT DOCUMENTS

| | | | |
|---|---|---|---|
| 1,075,736 | 10/1913 | Spiegel | 55/400 |
| 2,795,291 | 6/1957 | Pierce | 183/61 |
| 3,018,896 | 1/1962 | Gewiss | 210/403 |
| 3,045,411 | 7/1962 | Dalrymple | 55/400 |
| 3,289,397 | 12/1966 | Schonewald et al. | 55/400 |
| 3,800,514 | 4/1974 | Avondoglio et al. | 55/400 |
| 3,993,564 | 11/1976 | Novak | 210/360 A |
| 4,038,058 | 7/1977 | Miskiewicz | 55/317 |
| 4,049,401 | 9/1977 | Smith | 55/184 |
| 4,189,310 | 2/1980 | Hotta | 55/400 |
| 4,411,675 | 10/1983 | De Castella | 55/316 |
| 4,547,208 | 10/1985 | Oace | 55/400 |
| 4,714,139 | 12/1987 | Lorenz et al. | 55/400 |
| 4,903,462 | 2/1990 | Nagashima et al. | 55/400 |
| 4,922,691 | 5/1990 | Shen | 55/400 |
| 4,981,502 | 1/1991 | Gottschalk | 55/400 |
| 5,669,366 | 9/1997 | Beach et al. | 123/572 |
| 5,716,423 | 2/1998 | Krul et al. | 55/485 |

FOREIGN PATENT DOCUMENTS

| | | |
|---|---|---|
| 0 073 895 A1 | 3/1983 | European Pat. Off. . |
| 0 649 997 A1 | 4/1995 | European Pat. Off. . |
| 2 700 124 | 7/1994 | France . |
| 620499 | 10/1935 | Germany . |
| 3702765 | 8/1988 | Germany ............. 55/400 |
| 3938919C1 | 11/1989 | Germany . |
| 197 05 807 C1 | 7/1998 | Germany . |

OTHER PUBLICATIONS

*The Basics of Coalescing Filtration*, Bulletin 1300–700/NA, Parker Hannifin Corporation, 500 Glaspie St., P. O. Box 599, Oxford, MI 48371, 12 pages, no date.

*Primary Examiner*—Duane S. Smith
*Attorney, Agent, or Firm*—Woodard, Emhardt, Naughton Moriarty & McNett

[57] ABSTRACT

A coalescing filter for separating oil from a blowby gas stream includes a coalescing filter element designed with a plurality of relatively small flow-through pores which have the potential for creating a high restriction when wetted due to the surface tension which results. In order to reduce the restriction level, the coalescing filter is attached to a rotating component, such as a gear, so that rotary motion is imparted to the coalescing filter and centrifugal force is generated across the plurality of flow-through pores. By generating centrifugal force, any oil which might otherwise remain in said pores so as to clog the pores is spun out so that the pores of the coalescing filter element remain in a "dry" condition such that any restriction to continued flow is substantially lower than the restriction level when the pores are wetted.

23 Claims, 9 Drawing Sheets

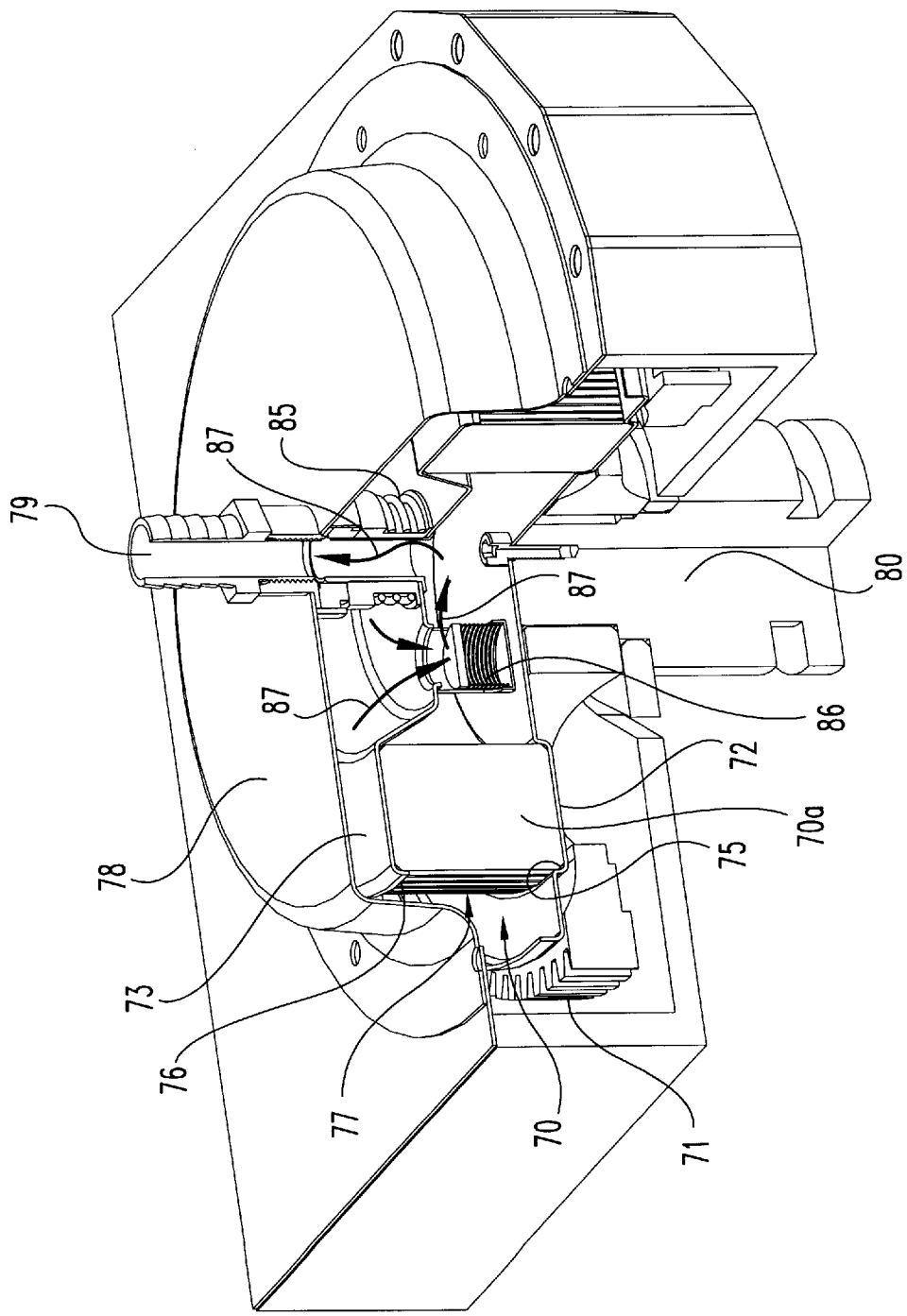

AIR/OIL COALESCER WITH CENTRIFUGALLY ASSISTED DRAINAGE

BACKGROUND OF THE INVENTION

The present invention relates in general to diesel engine filtration systems and in particular to a coalescing filter to remove oil aerosol from a blowby gas (exhaust) stream. More specifically, the present invention relates to a coalescing filter which is subjected to rotation in order to expel the coalesced liquid from the filter and thereby keep any flow restriction within the filter comparatively low.

In order to achieve high separation efficiency for oil aerosol in the 0.1–1.0 micron size range, it is necessary to use a relatively "tight" coalescing medium which is constructed from very fine fibers (melt-blown or glass). A consequence of fine fibers is the corresponding fine pore size distribution. The presence of fine pores in a coalescing filter can result in the pores becoming "clogged" with the liquid being separated, due to the surface tension and the corresponding "bridging" effect. This relatively high surface tension causes a correspondingly high restriction since it takes a large pressure to overcome the surface tension across a small wetted pore. It is known that the pressure required to "blow out" a pore is inversely proportional to the pore diameter. This behavior has been clearly verified by testing with various grades of media. What has been learned is that the pressure required to break through the film of a wetted pore is several times higher than the "dry" restriction at design face velocity. The lowest reported difference in wet flow restriction compared to dry flow restriction was a three-fold increase in flow restriction for the wetted condition.

Since engine crankcase pressure must be kept very near atmospheric pressure, approximately 5 inches of water, it is difficult to design a high-efficiency coalescer without resorting to a fairly elaborate arrangement of pressure control valves, vacuum assist devices, and similar mechanisms. For this reason, a means of keeping the coalescer element dry and operating at a low restriction would be a useful improvement to current filter designs. The present invention provides a solution to this identified need in a novel and unobvious manner.

The present invention includes a structural arrangement for use in cooperation with a coalescing filter for mounting the filter on a rotating component of the corresponding engine such as on a gear within a gear housing. The arrangement is configured such that the blowby gas stream must pass through the spinning coalescing element prior to exhausting to the atmosphere or to a location upstream of an air filter. By exhausting to the atmosphere or upstream of the air filter, the need for pressure control valving is eliminated. The actual filter element used to provide the improvement of the present invention may assume a pleated cylinder, disk, cone, cylinder, wafer, or tube shape, to mention only some of the possibilities.

The centrifugal force which is imparted on the coalescing filter element due to the rate of rotation causes the liquid to rapidly drain from the coalescing medium, similar to the spin-dry cycle of a washing machine. What has been found by testing is that increasing the "g" force dramatically accelerates the oil drainage, especially from tight ultra low penetration air (ULPA) media and HEPA media. An ULPA media has a 99.999 percent efficiency at 0.3 microns while the HEPA media has a 99.97 percent efficiency at 0.3 microns. At 1000 g's, the filter elements returned to their near dry weight in approximately 2 hours. In the static test at 1 g, very little drainage occurred, even in over 100 hours. Specifically for the HEPA media, as little as 100 g's resulted in a marked increase in oil drainage rate. This testing has validated the potential for the present invention to provide significant improvements in the design and utilization of coalescing filters.

SUMMARY OF THE INVENTION

A coalescing filter element for separating oil aerosol from a blowby gas (exhaust) stream according to one embodiment of the present invention is used in combination with a rotating component such that the component imparts rotary motion to the coalescing filter as a way to improve the oil drainage through the filter by overcoming the high restriction of wetted pores and maintaining the pores of the coalescing filter element at or near a "dry" condition.

One object of the present invention is to provide an improved coalescing filter arrangement.

Related objects and advantages of the present invention will be apparent from the following description.

BRIEF DESCRIPTION OF THE DRAWINGS

FIG. 6B is a partial, diagrammatic, perspective view, in partial section, of the FIG. 6 coalescing filter with a by-pass valve in an open condition.

DESCRIPTION OF THE PREFERRED EMBODIMENT

Figure 1:
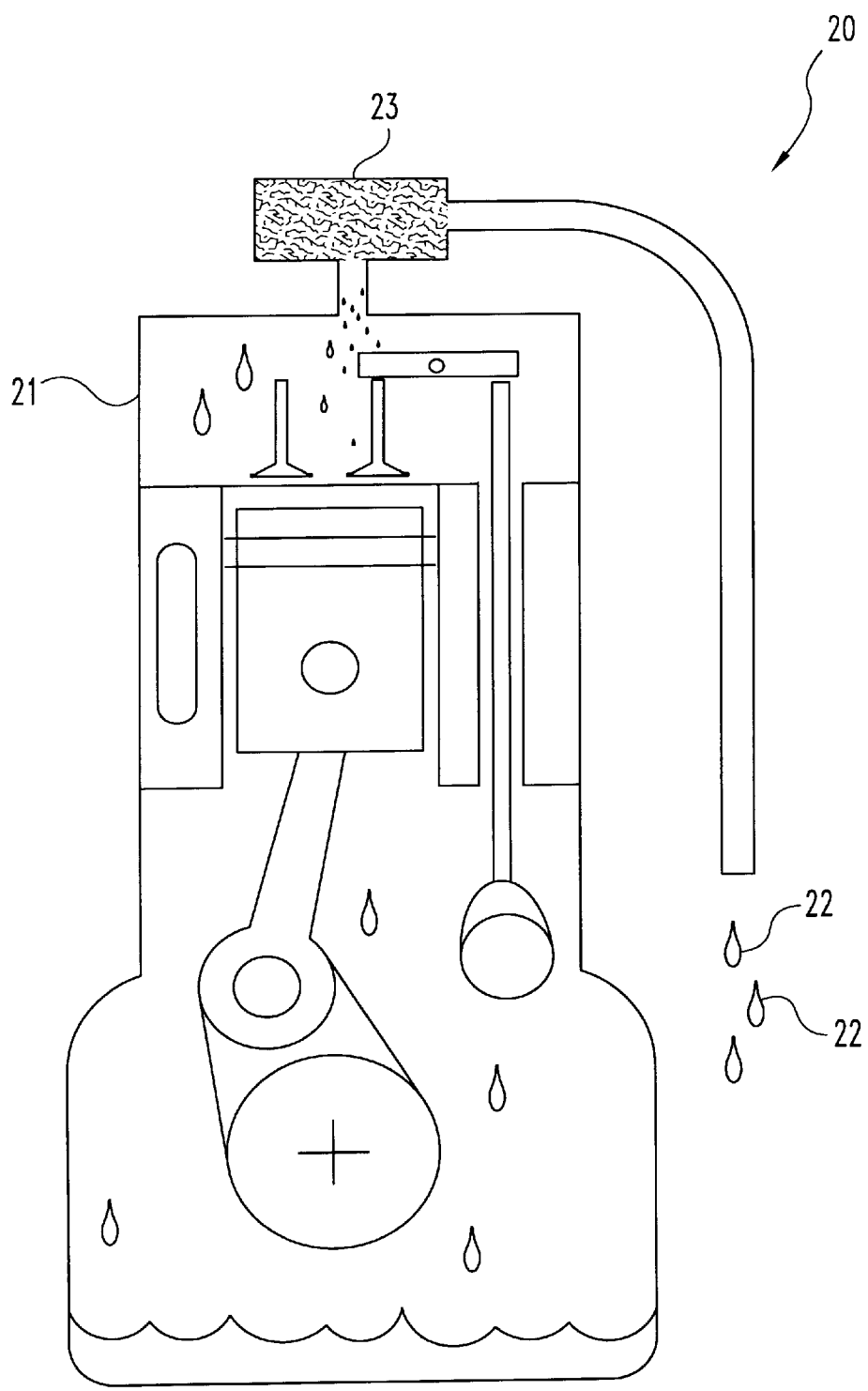
FIG. 1 is a diagrammatic, front elevational view of an engine crankcase showing the exhausting of oil-entrained blowby gas.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a diagrammatic illustration of a closed crankcase ventilation system 20 is provided. Within the crankcase 21 are sources of oil mist and oil spray which become entrained in aerosol form in the exhaust (blowby)

gas which needs to be vented from the crankcase. The blowby gas contains a relatively large quantity, 20–80% by mass, of sub-micron oil aerosol as represented by droplets 22. The order to prevent the oil aerosol from being vented to the atmosphere, or introduced into a downstream air filter, in such arrangements a coalescing filter 23 is typically added to separate or remove the oil aerosol from the blowby (exhaust) gas. There is a desire for the coalescing filter to work as efficiently as possible so that a majority of the entrained coil, and preferably all of the entrained coil, is separated from the blowby gas which needs to be vented. While conceptually this might seem simple, there are some practical size limitations and constraints that have to be addressed and incorporated into an effective and efficient solution.

In order to achieve high separation efficiency for oil aerosol in the 0.1–1.0 micron size range, the use of a relatively "tight" coalescing medium (filter) constructed from very fine fibers of either melt-blown (polymer) or glass is required. In creating the desired medium shape, glass fibers are "wet" laid in a random matte while the polymer (melt-blown) fibers are "dry" laid in a random matte. The fibers (glass or polymer) have a size range of 0.1 to 13.0 microns. The individual fibers (such as glass) are formed into a tight matrix. An effect of using fine fibers for construction of the coalescing medium (filter) is the corresponding fine pore size. With the use of glass or polymer fibers of this size range, the typical mean flow pore (M.F.P.) size ranges from 3 to 40 microns, depending on the desired efficiency. What has been learned is that fine pores in a coalescing filter become wetted with the liquid being separated. The surface tension of the liquid creates a bridging effect which creates the appearance that the filter is clogged, due to the high restriction across or through the coalescing filter. The high restriction is due to the fact that it takes a larger pressure to overcome the surface tension across a small wetted pore as compared to a "dry" pore. It is known that the pressure required to blow out a pore is inversely proportional to the pore diameter. This behavior is validated by the test results which are presented in graph form in FIG. 2. As used herein, the term "dry" in reference to the pores of the filter medium or element means a condition where the pores are kept open and unblocked or unplugged such that the surface tension is significantly reduced relative to the surface tension of a wetted pore.

Figure 2:
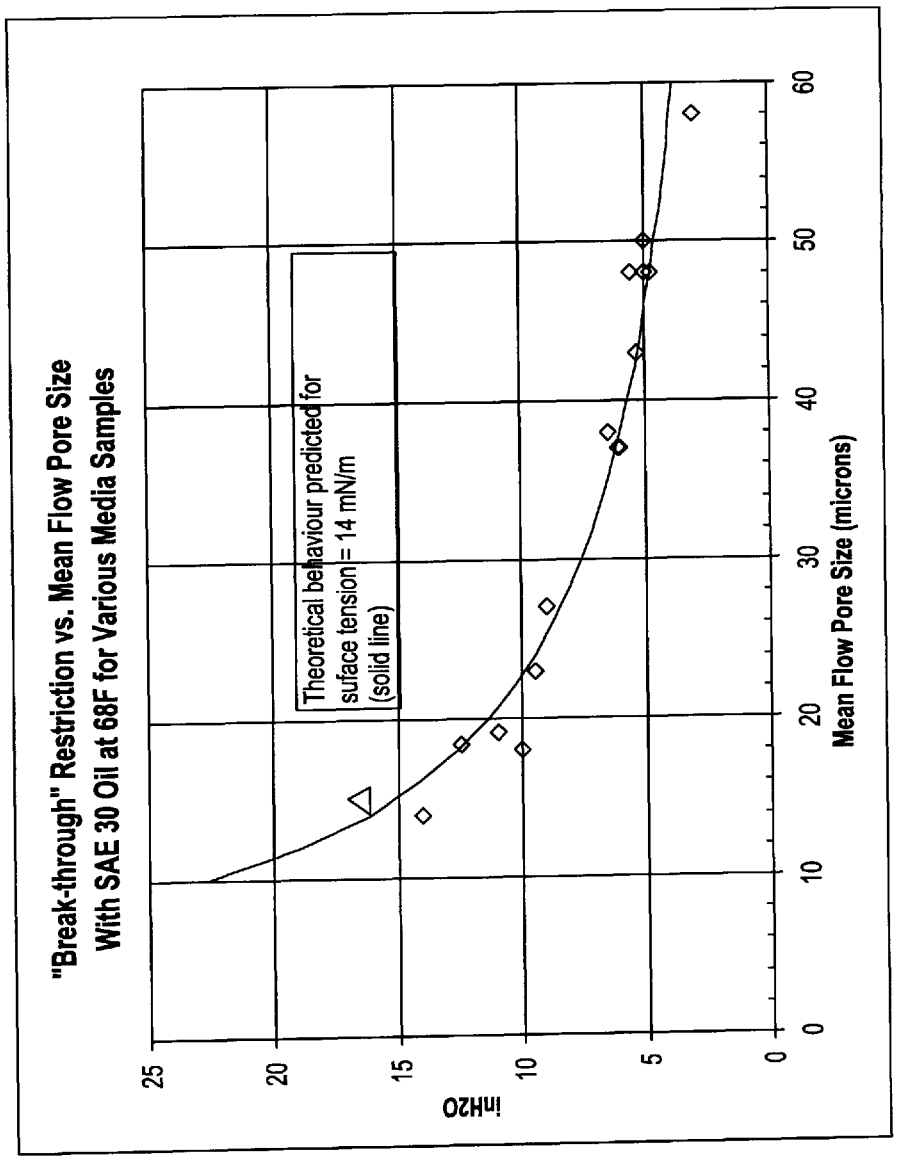
FIG. 2 is a graph plotting the breakthrough restriction as a pressure against the mean flow pore size.

Based upon the FIG. 2 test data and the data presented by the publication, *The Basics of Coalescing Filtration*, Bulletin 1300-700/NA, by Parker Hannifin Corporation, it is clearly established that there is a significant increase in the flow restriction of small pores in a wetted condition as contrasted or compared to a dry condition. In other words, it takes a significantly higher pressure to blow out the blocking or clogging liquid in a wetted pore in order for the flow to pass therethrough than the pressure required to push the flow through pores which are in a "dry" condition. While the Parker test data represents this as an approximate three-fold increase of wet versus dry, testing which has been conducted in association with the development of the present invention suggests a higher number for the increase for media ranging from 95 percent to 99.999 percent efficiency at 0.3 microns. Nevertheless, a three-fold increase in the restriction and the pressure required to open the pore is still significant and it is important to address the wet-dry restriction difference.

Since engine crankcase pressure must be kept very near atmospheric pressure (approximately 5 inches of water), it is difficult to design a high-efficiency (sub-micron particles) coalescer or coalescing filter without resorting to an elaborate arrangement of pressure control valves, vacuum assist devices, etc., which are relatively costly and complex. For this reason, a means or method of keeping the coalescer "dry" and thereby operating at a low restriction level (pressure) would be quite useful and an improvement to the more costly and complex alternative. This improvement is provided by the present invention which uses centrifugal force to unclog or unplug the small pores and effectively create and maintain a "dry" condition in the coalescing filter.

The present invention includes the design of a coalescing filter and the mounting of that coalescing filter to a rotating component of an engine, such as a gear within a gear housing or a cam gear. According to the present invention, the coalescing filter is able to take the form of a filtering disk, cone, cylinder, wafer, pleated cylinder, or tube, as well as other shapes consistent with the teachings herein. The placement and positioning of the coalescing filter is such that the blowby (exhaust) gas must cooperatively pass through the rotating or spinning coalescing filter prior to exhausting to the atmosphere or to a location upstream of an air filter.

The centrifugal force imparted onto the coalescing filter causes the liquid content separated from the blowby exhaust, which might otherwise clog the small pores of the filter, to rapidly drain from the coalescing filter medium and continue draining, similar to the spin-dry cycle of a washing machine. Effectively, a blow-out pressure across each wetted pore is generated by the centrifugal force due to the rotation. This approach keeps the small pores open by spinning out the oil that would otherwise wet the pores and effectively creates a "dry" condition which means a lower surface tension. The validity of the design theory or principle for incorporation into the structure and method of the present invention has been confirmed by testing using Parker coalescers. The tests were conducted using grades 2, 6, and 10 coalescers with their corresponding efficiencies of 99.999 percent, 99.97 percent, and 95 percent, respectively, at a 0.3 micron size. Various "g" force conditions were applied to each coalescer style or grade, including 1, 100, 500, and 1000 g's using a laboratory centrifuge. The weight loss versus time of each grade was measured after being thoroughly oil soaked. It was learned from such testing that increasing the g force dramatically accelerated the oil drainage, particularly from the tighter grades 2 and 6. At 1000 g's, the coalescer filters (elements) returned to a near dry weight in approximately 2 hours. In the static test at 1 g, which is their "normal" opening condition, very little drainage occurred, even after 100 hours. For the grade 6 element, as little as 100 g's resulted in a marked increase in the oil drainage rate.

With the concept and theory validated, it now becomes necessary to create an effective structure in order to utilize this principle. This effective structure is part of the present invention and one embodiment of the present invention is diagrammatically illustrated in FIG. 3. Specifically disclosed and illustrated is a high efficiency, coalescing filter 24. Coalescing filter 24 has a conical shape and is mounted onto rotating component 25. In the illustrated embodiment, component 25 includes a rotating shaft or post 26 and gear 27. The filter can be attached to post 26, gear 27, or both, since post 26 and gear 27 rotate in synchrony with each other due to their assembled and connected relationship.

The conical shape of filter 24 is set at an approximate 45 degree angle for the body portion 28. The preferred angle ($\alpha$) for the conical shape of filter 24 is between 0 degrees and 90 degrees, with the steeper angle approaching 90 degrees being preferred for maximum drainage. A first sheet metal bracket 31 is used to attach the body portion 28 to the rotating component 25. A second sheet metal bracket 32 encloses the back side or downstream side 33 of body portion 28. Bracket 32 includes an end portion 34 which fits over and conforms to the outer conical end 35 of body portion 28. Bracket edge 38 is spaced apart from bracket edge 39 so as to define an inlet window 40 which has an annular, conical shape, as is illustrated. Window 40 is effectively a frustoconical opening which is coincident with the outer surface of body portion 28. The blowby gas (exhaust) containing the oil aerosol is channeled and directed into window 40 such that the only flow path for the blowby gas is through the body portion 28 which comprises a "tight" arrangement of very fine fibers (melt-blown or glass). The preferred size range for the fibers is between 0.1 and 13.0 microns.

End portion 34 includes a plurality of spaced-apart apertures 41 which provide the exit path for the coalesced oil which is separated from the oil-entrained, blowby gas. The flow path of the blowby gas is denoted by arrows 42. In the FIG. 3 embodiment there are twelve apertures 41 set on 30 degree spacing around the outer periphery of the second bracket 32. The oil is thrown onto a collection surface by centrifugal force and, as a result, the oil is retained within the engine, such as within the crankcase. As the oil is continuously thrown onto the collection surface, it is not allowed to build up within the pores of the coalescing filter element and this keeps the pores open for continuous flow therethrough. The exhaust passing through body portion 28, which is now substantially free of oil, is routed out of the enclosure for gear 27, passed gear cover 44.

The creation of centrifugal force directed outwardly across or through the coalescing filter element blows out any oil that might otherwise block or clog the small pores of the element and thereby create a higher surface tension. When sufficient blow out force is generated, the oil is cleared from the pores and this keeps the pores in a "dry" condition with a significantly lower surface tension. This in turn makes it easier for the blowby gas to flow through the filter, separating the entrained oil as the flow through continues.

While the specific arrangement of brackets and passageways can take on a variety of configurations, there are certain key provisions or characteristics of the present invention which need to be maintained. These key provisions includes using a coalescing filter, attaching the filter to a rotating component, at or at least rotating the coalescing filter in some fashion, routing the oil-entrained, blowby gas (exhaust) into the filter, and isolating the separated oil from the "clean" exhaust. The separated oil is retained in the engine and the clean exhaust is routed to the atmosphere or to an air filter, depending on any subsequent use for the exhaust as part of other engine functions.

Figure 3:
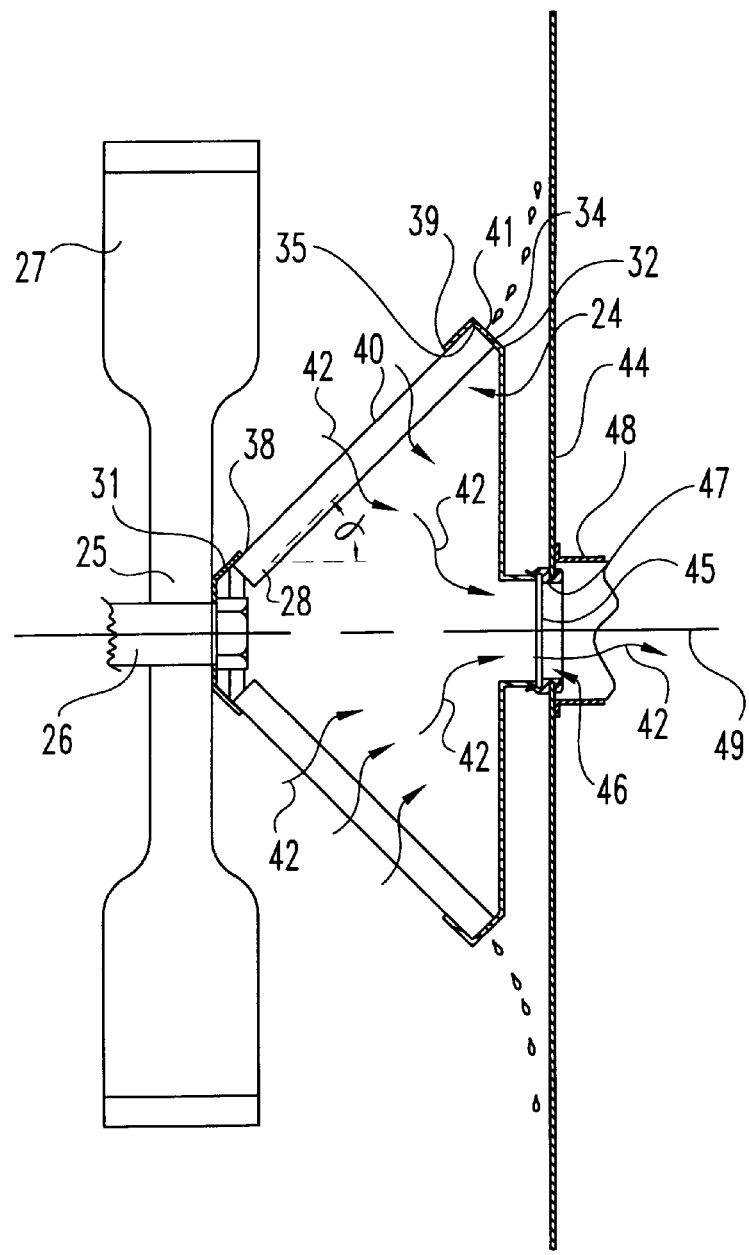
FIG. 3 is a partial, diagrammatic, side elevational view in full section of a coalescing filter attached to a rotating engine component according to the present invention.

To complete the description of what is illustrated in FIG. 3, bracket 32 interfits with panel 45 which is sealed within the exhaust opening 46 of gear cover 44 by grommet 47. Conduit 48 is attached to gear cover 44 around opening 46 and connects to a downstream air filter or is alternatively routed to the atmosphere, as previously described. While only partial portions of the structures of FIG. 3 have actually been illustrated, it is to be understood that the components and features of FIG. 3 are, for the most part, annular in construction and are arranged relative to each other in a generally concentric manner and are symmetrical about axis line 49.

Figure 4:
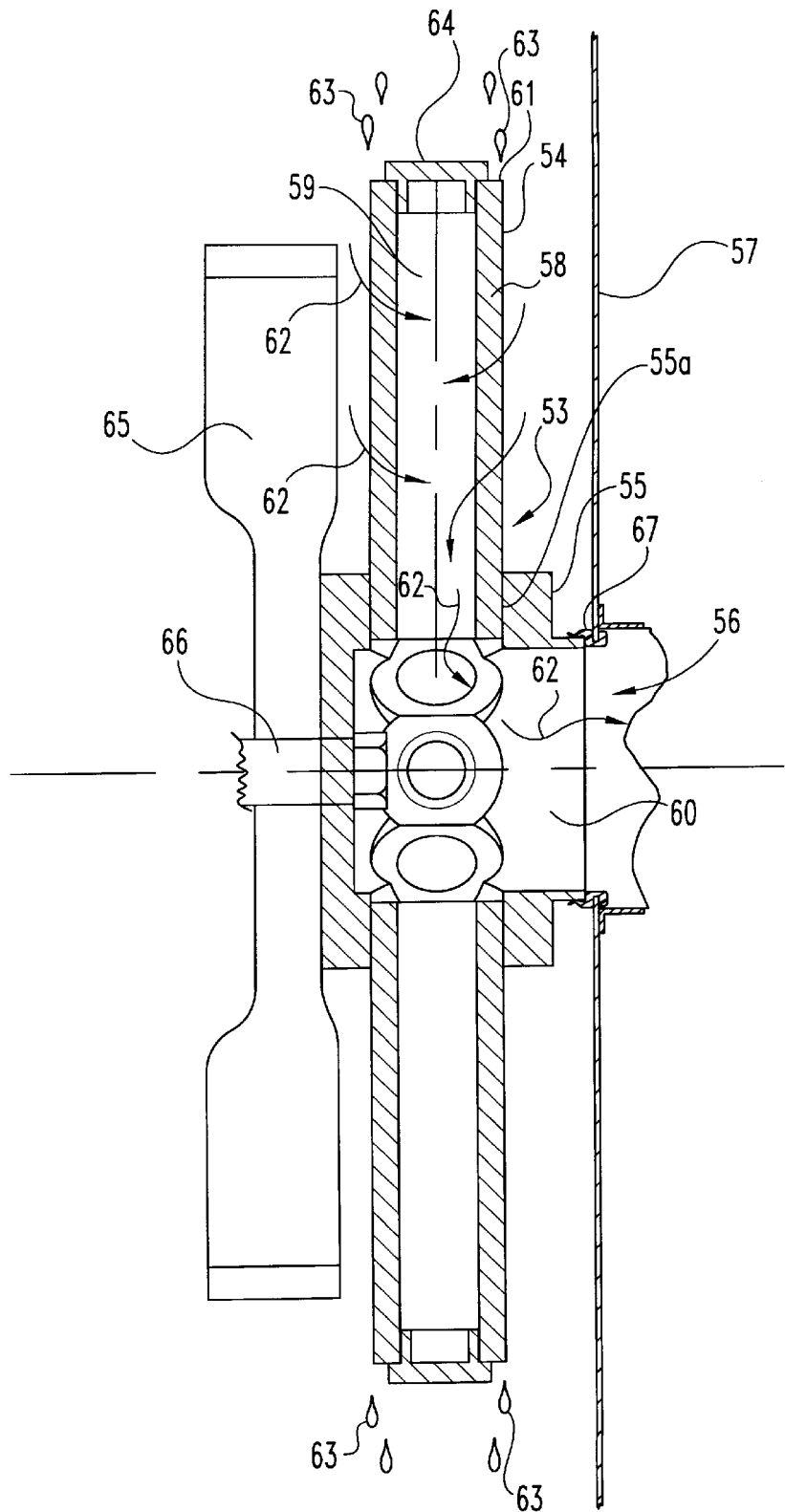
FIG. 4 is a partial, diagrammatic, side elevational view in full section of another embodiment of a coalescing filter attached to a rotating engine component according to the present invention.
Figure 5:
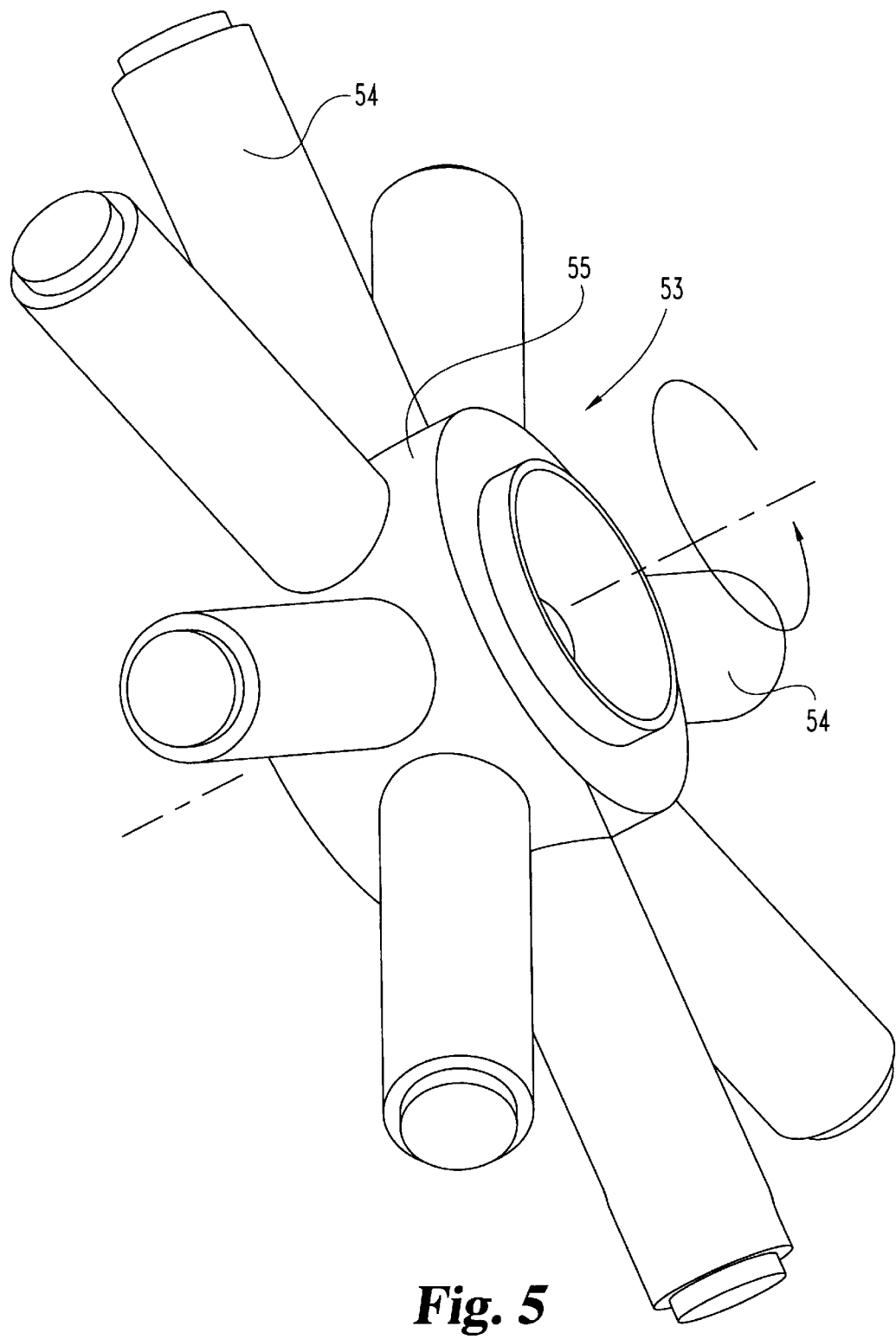
FIG. 5 is a perspective view of the FIG. 4 coalescing filter.

An alternative embodiment or configuration of the present invention is illustrated in FIGS. 4 and 5. In FIGS. 4 and 5, the coalescing filter (element) assumes a somewhat different configuration, but the construction principles and operational theory are effectively the same as those illustrated and described with regard to the FIG. 3 arrangement and in particular with regard to coalescing filter 24. Coalescing element 53 (see FIG. 5) is a wheel-like member with eight hollow spokes 54, which are equally spaced around and extend radially outwardly from hub 55. Each spoke 54 is a filter element constructed from fine fibers, preferably glass or alternatively polymer. The hub 55 is prepared with a cylindrical opening 55a for each spoke and each spoke is pressed into its corresponding hub opening. By placing element 53 within an enclosed space such that there is a limited and defined flow path through the space, this structure establishes a defined flow path through coalescing element 53. Accordingly, oil separation from the flowing oil-entrained blowby gas stream is both provided for and achievable. The flow path of the blowby gas is denoted by arrows 62. The separated oil is denoted by droplets 63.

The entering flow of oil-entrained, blowby gas has a single exit path which is through cylindrical outlet 56 which is centered in gear cover 57. In order to reach outlet 56, the entering flow must pass through the sidewalls 58 of the hollow glass filter element spokes 54 and from there into the hollow interior space 59 of each spoke. The hollow interior space 59 of each spoke 54 is in flow communication with the hollow interior space 60 of hub 55 which opens directly into outlet 56. The hollow center of the outer end 61 of each spoke 54 is closed by means of a corresponding plug 64 which is pressed into the hollow center of each end 61.

The coalescing capability of element 53 is provided by the construction, material, and configuration of each glass filter element spoke 54. The blowby gas is able to flow through the cylindrical sidewall of each spoke 54 and with the element 53 rotating at a relatively high speed, the oil is coalesced and, with the assistance of centrifugal force, is routed out the end 61 of each spoke. The hub 55 is connected to rotating gear 65, or alternatively to cooperating shaft 66, or alternatively to both, in order to provide the desired rotation to element 53 in order to generate the required centrifugal force. Grommet 67 provides the sealed interface between hub 55 and gear cover 57 around outlet 56. The separated oil exiting from the end of each spoke is accumulated and retained within the area between gear 65 and cover 57 while the clean exhaust exits the structure by way of outlet 56 to either the atmosphere or to a downstream air filter. While the exit location upstream of any air filter is preferred, an exit location downstream of an air filter is an option. In this case, a vacuum control valve would be needed.

Figure 6:
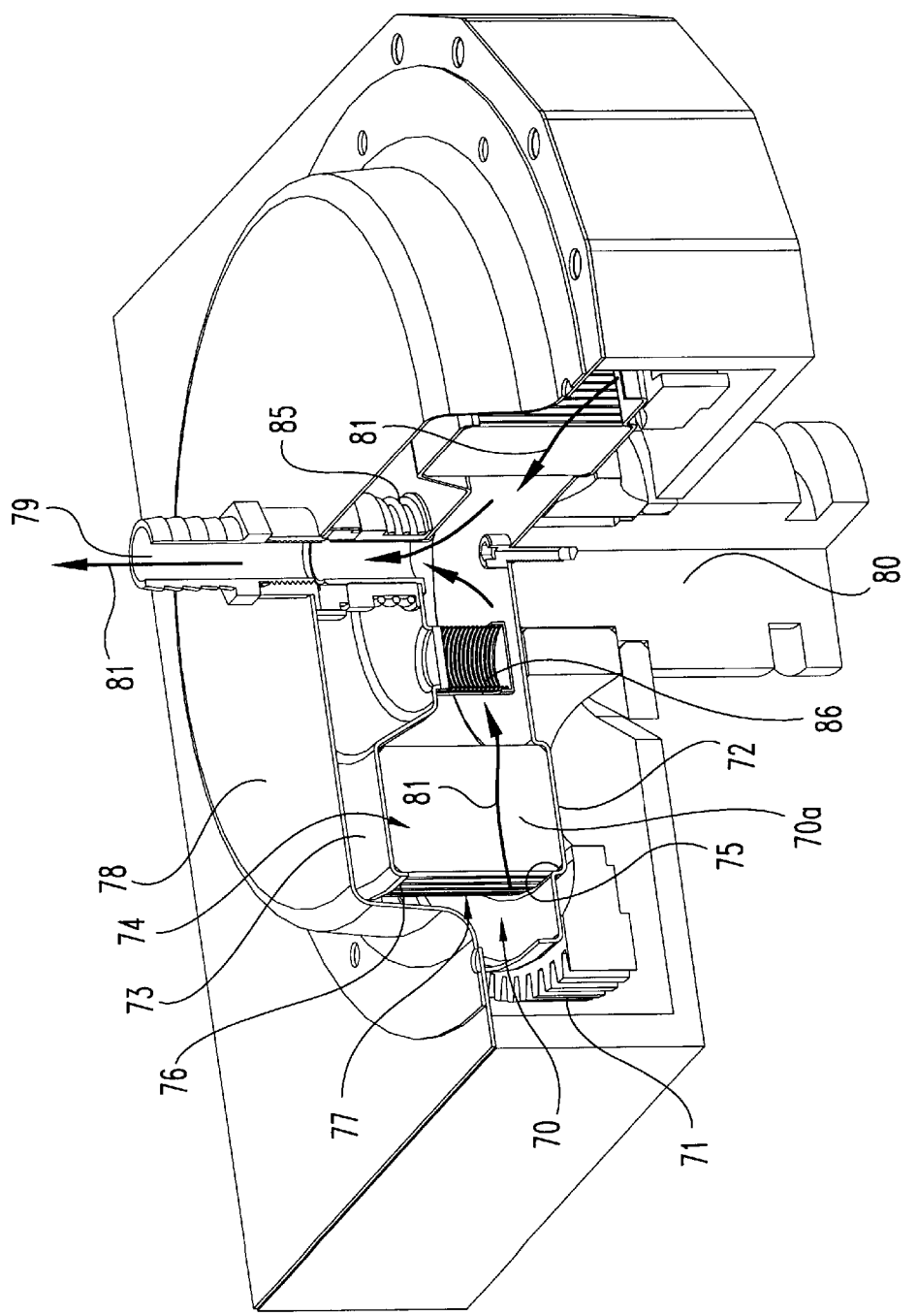
FIG. 6 is a partial, diagrammatic, perspective view, in partial section, of another embodiment of a coalescing filter attached to a rotating engine component according to the present invention.

Another embodiment of the present invention is illustrated in FIG. 6. The illustrated coalescing filter assembly 70 includes a cylindrical pleated filter 70a which has a coiled cylindrical shape. The filter assembly 70 is assembled to a rotating component, in this case the shaft for cam gear 71. Inner and outer sheet metal panels 72 and 73, respectively, sealingly enclose the opposite ends or circular faces of filter 70a so as to define an interior space 74. The edges 75 and 76 of the inner and outer panels 72 and 73 are spaced apart so as to define an annular inlet flow "window" 77 for the incoming, oil-entrained, blowby gas (exhaust). The flow path of the blowby gas is denoted by arrows 81. Panels 72 and 73 support filter 70a which is secured therebetween. Panels 72 and 73 are attached to shaft 80 in order to provide the rotation to filter assembly 70. Gear cover 78 is assembled over outer panel 73 and defines therein a centrally-positioned blowby outlet 79. Rotating shaft 80 supports cam gear 71 and provides the rotary motion to the cam gear. The centrifugal force which is generated expels the droplets of oil blocking the small pores of the filter element so as to effectively keep the pores "dry", thereby reducing the surface tension and the corresponding flow restriction.

Included as part of the preferred construction of the FIG. 6 coalescing filter assembly 70 is a spring-loaded face seal 85 (see FIG. 6A) and a by-pass valve 86. In the event the filter becomes plugged, the by-pass valve, which is in a normally closed condition as illustrated in FIG. 6, is constructed and arranged to move to an open condition (see FIG. 6B) in response to a differential pressure build up across the filter assembly. At an elevated pressure level, the valve opens as illustrated in FIG. 6B and the flow vents to outlet 79 as illustrated by arrows 87. The flow which is unable to move through the filter is thus routed through the by-pass valve 86. This then prevents the build up of what could become a catastrophically high crankcase pressure.

Face seal 85 (see FIG. 6A) provides the advantage of permitting a higher tolerance for axial position shifts between certain components of filter assembly 70 which can be caused by vibration or flexure. More specifically, this concern relates to vibration or flexure of engine components with respect to gear cover 78.

Figure 6A:
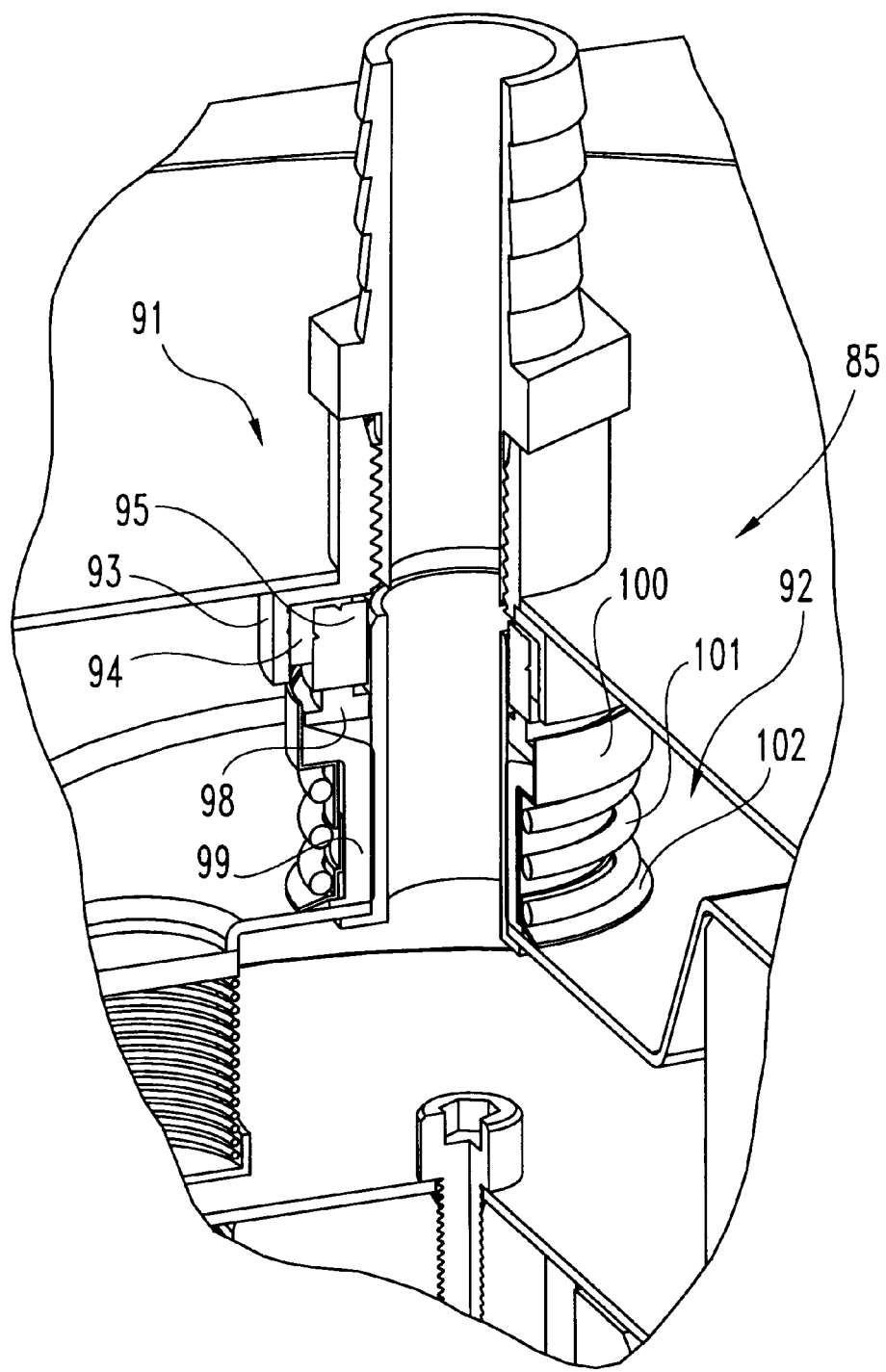
FIG. 6A is a perspective view of the face seal used in the FIG. 6 embodiment.

With detailed reference to FIG. 6A, face seal 85, which is illustrated in a partial section perspective, includes an upper (stationary) seal assembly 91 and a lower seal assembly 92. The upper seal assembly includes a seal housing 93, boot gasket 94, and ceramic ring 95. The boot gasket makes both radial and compression seals with the seal housing 93. The ceramic ring 95 makes a face seal with the lower seal assembly 92.

The lower seal assembly 92 includes a dynamic seal member 98, shaft seal 99, upper housing section 100, compression spring 101, and lower housing section 102. The upper and lower housing sections 101 and 102 of the lower seal assembly 92 are able to move relative to each other. Compression spring 101 allows axial movement while maintaining positive seal force at the upper/lower seal interface. The dynamic seal member 98 is constructed and arranged to enable the rotation of the entire lower seal assembly 92 with the shaft over which the lower seal assembly is installed. The shaft seal 99 makes a radial seal with the rotating shaft member and serves to hold the lower seal assembly components together.

Figure 6C:
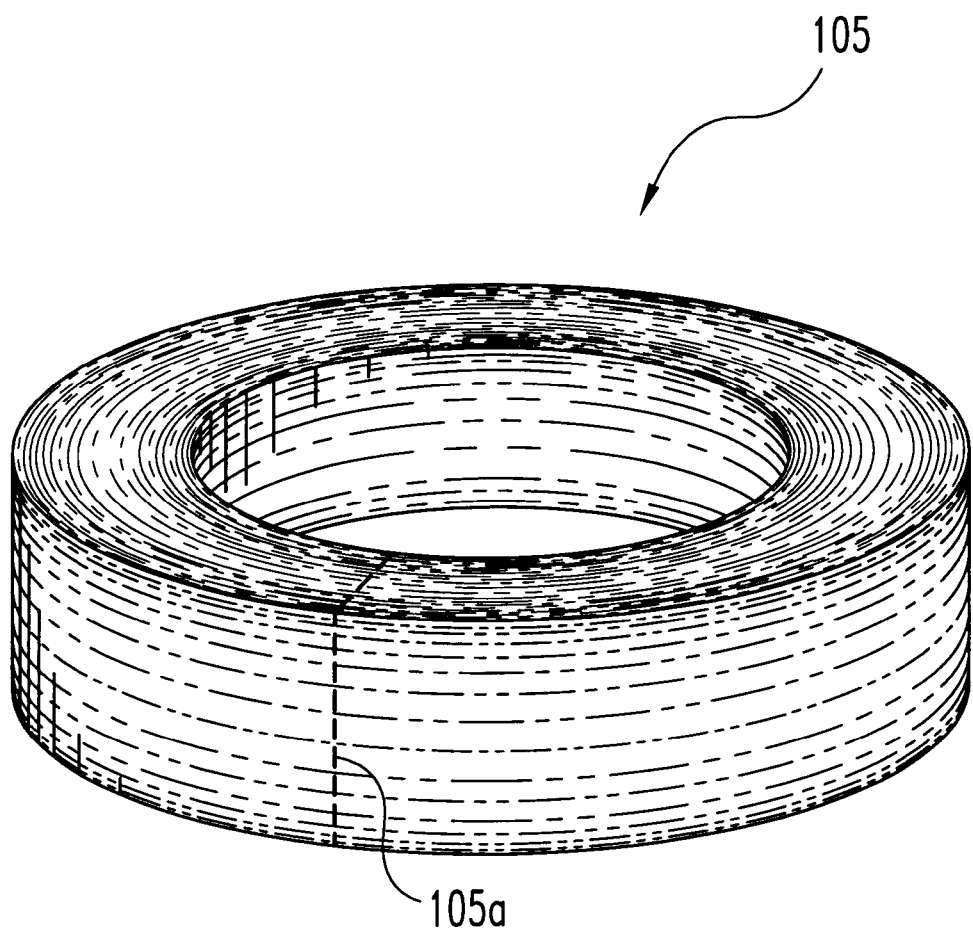
FIG. 6C is a perspective view of a solid block of media in a cylindrical form which is suitable for use in the FIG. 6 embodiment.

Illustrated in FIG. 6C is an alternative filter 105 which is a solid block of filtering media shaped into a cylindrical form. This alternative filter 105 is suitable for use as part of the coalescing filter assembly 70 of FIG. 6 as a replacement for filter 70*a*. In the FIG. 6 embodiment, the coalescing filter 70*a* is a pleated, cylindrical form. The alternative is a solid block which may be coiled into the cylindrical form and this option is denoted by the broken-line seam in FIG. 6C. As an alternative, filter 105 may be initially formed or fabricated in a cylindrical shape as is illustrated without the broken-line seam 105*a*.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:

a rotating component; and a coalescing filter assembly attached to said rotating component so as to impart rotary motion to said coalescing filter assembly, said coalescing filter assembly being constructed and arranged to separate oil from blowby gas and including a filtering medium defining a plurality of flow-through pores, said filtering medium being arranged into a pleated element with a cylindrical shape and the rate of rotation of said coalescing filter assembly being sufficient to generate a centrifugal force through said plurality of flow-through pores to keep said pores in a dry condition.

2. The combination of claim 1 wherein said rotating component is a gear.

3. The combination of claim 1 wherein said coalescing filter assembly is constructed and arranged with a plurality of glass fibers grouped into a tight matrix.

4. The combination of claim 1 wherein said pleated element is supported by and secured between a first panel on one side of said pleated element and a second panel on an opposite side of said pleated element.

5. The combination of claim 4 wherein said first and second panels provide the connection of the coalescing filter assembly to the rotating component.

6. In combination:

a rotating component; and a coalescing filter assembly attached to said rotating component so as to impart rotary motion to said coalescing filter assembly, said coalescing filter assembly being constructed and arranged to separate oil from blowby gas and including a filtering medium defining a plurality of flow-through pores, the rate of rotation of said coalescing filter assembly being sufficient to generate a centrifugal force through said plurality of flow-through pores to keep said pores in a dry condition, said coalescing filter assembly having a coalescing filter element shaped from said filtering medium and configured with a central hub and a plurality of hollow spokes radiating from said hub.

7. The combination of claim 6 wherein said flow-through pores have a mean flow pore size that ranges from 3 to 40 microns.

8. A coalescing filter assembly comprising:

a support structure configured and arranged for attachment to a rotating component; and a cylindrical coalescing filter element constructed and arranged for attachment to said support structure such that rotary motion is able to be imparted to said coalescing filter element, said coalescing filter element being constructed and arranged to separate oil from blowby gas and including a pleated filtering medium defining a plurality of flow-through pores, the rate of rotation of said coalescing filter element being sufficient to generate a centrifugal force through said plurality of flowthrough pores to keep said pores in a dry condition.

9. The coalescing filter assembly of claim 8 wherein said support structure includes a first panel on one side of said coalescing filter element and a second panel on an opposite side of said coalescing filter element.

10. The coalescing filter assembly of claim 9 which further includes a by-pass valve for venting said blowby gas around said coalescing filter element.

11. The coalescing filter assembly of claim 10 which further includes a face seal positioned between an outer panel and a gear cover.

12. The coalescing filter assembly of claim 11 wherein said face seal is spring loaded.

13. The coalescing filter assembly of claim 8 which further includes a by-pass valve for venting said blowby gas around said coalescing filter element.

14. The coalescing filter assembly if claim 8 which further includes a face seal positioned between an outer panel and a gear cover.

15. The coalescing filter assembly of claim 14 wherein said face seal is spring loaded.

16. A coalescing filter assembly comprising:

a coalescing filter constructed and arranged for attachment to a rotating component so as to impart rotary motion to said coalescing filter, said coalescing filter being constructed and arranged to separate oil from blowby gas and including a filtering medium defining a plurality of flow-through pores, the rate of rotation of said coalescing filter being sufficient to generate a centrifugal force through said plurality of flow-through pores to keep said pores in a dry condition, said coalescing filter being shaped from said filtering medium and configured with a central hub and a plurality of hollow spokes radiating from said hub.

17. The coalescing filter assembly of claim 16 wherein said flow-through pores have a means flow pore size that ranges from 3 to 40 .

18. In combination:

a rotating gear; and a coalescing filter assembly having a conical shape and being attached to said rotating gear so as to impart rotary motion to said coalescing filter assembly, said coalescing filter assembly being constructed and arranged to separate oil from blowby gas and including a filtering medium defining a plurality of flow-through pores, the rate of rotation of said coalescing filter assembly being sufficient to generate a centrifugal force through said plurality of flow-through pores to keep said pores in a dry condition, said coalescing filter assembly including a first end adjacent said rotating gear and a second end, said second end being constructed and arranged for exit of coalesced oil from said coalescing filter assembly.

19. In combination:

a rotating component;

a coalescing filter assembly attached to said rotating component so as to impart rotary motion to said coalescing filter assembly, said coalescing filter assembly being constructed and arranged to separate oil from blowby gas and including a filtering medium defining a plurality of flow-through pores, said filtering medium being arranged into an element with a cylindrical shape and the rate of rotation of said coalescing filter assembly being sufficient to generate a centrifugal force through said plurality of flow-through pores to keep said pores in a dry condition; and a bypass valve for venting said blowby gas around said filtering medium.

20. In combination:

a rotating component;

a coalescing filter assembly attached to said rotating component so as to impart rotary motion to said coalescing filter assembly, said coalescing filter assembly being constructed and arranged to separate oil from blowby gas and including a filtering medium defining a plurality of flow-through pores said filtering medium being arranged into an element with a cylindrical shape and the rate of rotation of said coalescing filter assembly being sufficient to generate a centrifugal force through said plurality of flow-through pores to keep said pores in a dry condition; and a face seal positioned between an outer panel and a gear cover.

21. A coalescing filter assembly comprising:

a coalescing filter constructed and arranged for attachment to a rotating component so as to impart rotary motion to said coalescing filter, said coalescing filter being constructed and arranged to separate oil from blowby gas and including a filtering medium defining a plurality of flow-through pores, the rate of rotation of said coalescing filter being sufficient to generate a centrifugal force through said plurality of flow-through pores to keep said pores in a dry condition; and a bypass valve for venting blowby gas around said coalescing filter.

22. A coalescing filter assembly comprising:

a coalescing filter having a conical shape and being constructed and arranged for attachment to a rotating component so as to impart rotary motion to said coalescing filter, said coalescing filter being constructed and arranged to separate oil from blowby gas and including a filtering medium defining a plurality of flow-through pores, the rate of rotation of said coalescing filter being sufficient to generate a centrifugal force through said plurality of flow-through pores to keep said pores in a dry condition, said coalescing filter includes a first end adjacent said rotating component and a second end, said second end being constructed and arranged for the exit of coalesced oil from said coalescing filter.

23. A coalescing filter for use in cooperation with a rotating component for imparting rotary motion to said coalescing filter, said coalescing filter having a cylindrical shape and being constructed and arranged for attachment to said rotating component, said coalescing filter being constructed and arranged to separate oil from blowby gas and including a pleated filtering medium defining a plurality of flow-through pores, the rate of rotation of said coalescing filter being sufficient to generate a centrifugal force through said plurality of flow-through pores to keep said pores in a dry condition.

\* \* \* \* \*